June 9, 1964   R. W. McJONES   3,136,122
SOLID PROPELLANT CARTRIDGE
Filed April 24, 1959

INVENTOR.
ROBERT W. McJONES
BY
ATTORNEYS

United States Patent Office 3,136,122
Patented June 9, 1964

3,136,122
SOLID PROPELLANT CARTRIDGE
Robert W. McJones, Los Angeles, Calif., assignor, by mesne assignments, to Sperry Rand Corporation, a corporation of Delaware
Filed Apr. 24, 1959, Ser. No. 808,663
5 Claims. (Cl. 60—39.47)

This invention relates to power transmissions, and more particularly to a power transmission prime mover which supplies hot-gas combustion products to, for example, a fluid motor which drives a hydraulic pump. Such systems have been found to have weight, reliability and cost advantages over conventional drives and are especially useful in the missile field.

In the past, solid propellant charges having a predetermined burning rate have been used as a source of hot gas. While these devices have been workable, wide variation has been found in the basic burning rates of supposedly similar cartridges. Further, once combustion has been initiated the burning rate fluctuates as a function of hot-gas pressure and other variables.

It is therefore an object of this invention to provide an improved, solid propellant cartridge for use as a hot gas generator.

More specifically, it is an object of this invention to provide such a cartridge in which the burning rate is adjustable in accordance with system requirements.

Further objects and advantages of the present invention will be apparent in the following description, reference being had to the accompanying drawing wherein a preferred form of the present invention is clearly shown.

Figure 1:
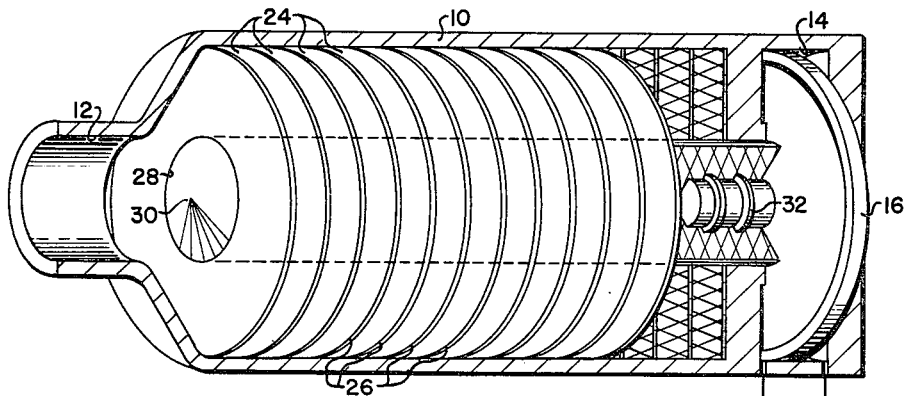
FIGURE 1 is a cutaway view of a solid propellant cartridge embodying the present invention.

Referring now to FIGURE 1, there is shown a heat resistant casing 10, having an outlet port 12 which is connectable to a hot-gas consuming device such as a fluid motor, not shown. At the end of the casing opposite to port 12, a double acting control cylinder 14 is provided, in which is reciprocally mounted a control piston 16. A reservoir 18, pump 20 and a control valve 22 are shown schematically and are representative of various means which could be employed to shift control piston 16.

Inside casing 10 is a stacked array of transversely extending, disc-like, centrally perforate primary layers 24 composed of solid propellant having a particular burning rate. The primary layers 24 are separated from one another by similarly shaped, but thinner, secondary layers 26 composed of solid propellant having a higher burning rate than the primary layers 24. By way of example, secondary layers 26 might be one-tenth as thick as primary layers 24, and might be composed of solid propellant having a burning rate four times as great as that of layers 24.

The central perforations in the primary and secondary layers, 24 and 26 respectively, form a bore 28. Snugly but slidably fitted in bore 28 is a cylindrical core 30 which is composed of solid propellant having the same burning rate as primary layers 24. Core 30 is secured to control piston 16 at 32, so as to be longitudinally shiftable by piston 16 through the stack of propellant layers in either direction.

Figure 2:
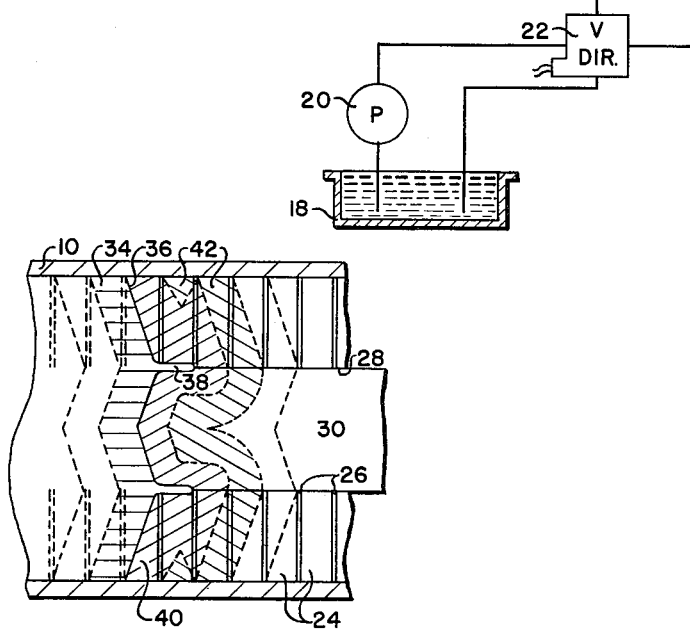
FIGURE 2 is a longitudinal section through a portion of FIGURE 1, shaded to show the approximate conformation and progression of the flame front, as hereinafter discussed.

Referring now to FIGURE 2, the shaded area 34 represents the amount of propellant burned per unit time in steady state burning. Now if, when the flame front reaches the line 36, the core 30 is momentarily moved rightwardly for a distance approximately equal to the thickness of one of the layers 24 and then returned to its original position, a kink is produced in the flame front at 38, and an additional fast burning layer 26 is exposed to flame in the region of bore 28. In the next unit time, an amount of propellant represented by the shaded area 40 is burned. Area 40 is approximately double area 34. In the next unit time, the burning rate has returned substantially to normal and an amount of propellant represented by the area 42 is burned.

It should be noted that control can be effected at any point throughout the full length of the cartridge, even though the maximum possible movement of core 30 may be relatively small. This is true because the core 30 is burned as the flame front progresses through the cartridge and is thus maintained at the same effective length as the rest of the cartridge.

The fast burning layers also perform the function of rapidly stabilizing and evenly distributing the flame front in the event of uneven flame front progression during steady state burning.

It will be apparent from the foregoing that the present invention has provided an improved solid propellant cartridge having a controllable burning rate.

While the form of embodiment of the invention as herein disclosed constitutes a preferred form it is to be understood that other forms might be adopted, all coming within the scope of the claims which follow.

What is claimed is as follows:

1. A solid propellant cartridge comprising: a stacked array of transversely extending, centrally perforate primary layers of propellant having a particular burning rate, said primary layers being separated from each other by relatively thin, transversely extending, centrally perforate secondary layers of propellant having a higher burning rate than said primary layers; a solid propellant material core extending through the central perforations; and means for longitudinally shifting said core, whereby the burning rate of said cartridge can be controlled.

2. A solid propellant cartridge comprising: a stacked array of transversely extending, centrally perforate primary layers of propellant having a particular burning rate, said primary layers being separated from each other by relatively thin, transversely extending, centrally perforate secondary layers of propellant having a higher burning rate than said primary layers; a solid propellant material core having said particular burning rate extending through the central perforations; and means for longitudinally shifting said core, whereby the burning rate of said cartridge can be controlled.

3. A solid propellant cartridge comprising: a stacked array of transversely extending, disc-like, centrally perforate primary layers of propellant having a particular burning rate, said primary layers being separated from each other by relatively thin, transversely extending, disc-like, centrally perforate secondary layers of propellant having a higher burning rate than said primary layers; a solid propellant material core extending through the central perforations; and means for longitudinally shifting said core, whereby the burning rate of said cartridge can be controlled.

4. A solid propellant cartridge comprising: an elongated body of propellant presenting an end surface for burning and having a central bore therethrough; a solid propellant material core extending through said bore to present an additional end surface for burning; and means for shifting said core longitudinally, forward and backward, relative to said body of propellant during burning of said cartridge so as to change the relative position of said end surfaces and thus modify the burning rate.

5. A solid propellant cartridge comprising: an elongated body of propellant presenting an end surface for burning and having a central bore therethrough; a solid propellant material core extending substantially through the length of said bore to present an additional end surface for burning; and means for shifting said core longitudinally relative to said body of propellant during burning of said cartridge so as to change the relative position of said end surfaces and thus modify the burning rate.

References Cited in the file of this patent

UNITED STATES PATENTS

| | | |
|---|---|---|
| 2,247,111 | Batchelor et al. | June 24, 1941 |
| 2,763,127 | Golden | Sept. 18, 1956 |
| 2,926,613 | Fox | Mar. 1, 1960 |
| 3,023,570 | Crouch | Mar. 6, 1962 |